United States Patent
Zhou et al.

(10) Patent No.: US 12,302,241 B2
(45) Date of Patent: May 13, 2025

(54) METHOD FOR DETERMINING A STATE, ELECTRONIC DEVICE, AND NON-TRANSITORY COMPUTER-READABLE STORAGE MEDIUM

(71) Applicant: SPREADTRUM COMMUNICATIONS (SHANGHAI) CO., LTD., Shanghai (CN)

(72) Inventors: Huayu Zhou, Shanghai (CN); Zhengang Pan, Shanghai (CN); Zhenzhu Lei, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 350 days.

(21) Appl. No.: 17/794,420

(22) PCT Filed: Feb. 7, 2021

(86) PCT No.: PCT/CN2021/075845
§ 371 (c)(1),
(2) Date: Jul. 27, 2022

(87) PCT Pub. No.: WO2021/148049
PCT Pub. Date: Jul. 29, 2021

(65) Prior Publication Data
US 2023/0074847 A1    Mar. 9, 2023

(30) Foreign Application Priority Data
Jan. 21, 2020   (CN) .......................... 202010072622.0

(51) Int. Cl.
H04W 52/02      (2009.01)
H04W 76/28      (2018.01)

(52) U.S. Cl.
CPC ....... *H04W 52/0206* (2013.01); *H04W 76/28* (2018.02)

(58) Field of Classification Search
CPC .......................... H04W 76/28; H04W 52/0206
USPC .......................................................... 370/328
See application file for complete search history.

(56) References Cited

U.S. PATENT DOCUMENTS

| | | | |
|---|---|---|---|
| 10,433,330 B2 | 10/2019 | Vajapeyam et al. | |
| 2021/0242987 A1* | 8/2021 | Kazmi | .................. H04L 5/0001 |
| 2023/0164792 A1* | 5/2023 | Cheng | .................. H04W 72/23 |
| | | | 370/329 |

FOREIGN PATENT DOCUMENTS

| | | |
|---|---|---|
| CN | 106301721 A | 1/2017 |
| CN | 108886804 A | 11/2018 |
| CN | 110519853 A | 11/2019 |
| CN | 110677887 A | 1/2020 |

(Continued)

OTHER PUBLICATIONS

Qualcomm Incorporated."Potential Techniques for UE Power Saving, R1-1903016" (3GPP TSG-RAN WG1 #96), Feb. 16, 2019.

(Continued)

*Primary Examiner* — Peter G Solinsky
(74) *Attorney, Agent, or Firm* — HAUPTMAN HAM, LLP

(57) ABSTRACT

A method for determining a state is provided. The method for determining a state includes acquiring indication signaling, and determining that a secondary cell (SCell) in a SCell sub-group enters a dormancy state or a non-dormancy state, according to the indication signaling.

17 Claims, 2 Drawing Sheets

ACQUIRE INDICATION SIGNALING — S11

DETERMINE THAT A SCELL IN A SCELL SUB-GROUP ENTERS A DORMANCY STATE OR A NON-DORMANCY STATE, ACCORDING TO THE INDICATION SIGNALING — S12

(56) References Cited

FOREIGN PATENT DOCUMENTS

WO    2019084184 A1    5/2019

OTHER PUBLICATIONS

Huawei, Hisilicon. "Discussion on low latency SCell activation and efficient SCell management, R1-1911875" (3GPP TSG RAN WG1 Meeting RAN1#99), Nov. 9, 2019.
Nokia, Nokia Shanghai Bell. "Efficient CA design R1-1912281" (3GPP TSG RAN WG1 Meeting RAN1#99), Nov. 7, 2019.
WIPO, International Search Report and Written Opinion for International Application No. PCT/CN2021/075845, May 10, 2021.
Ericsson. Reduced latency Scell management for NR CA, R1-1911015, 3GPP TSG-RAN WG1 #98bis, Oct. 14-20, 2019.
Huawei, HiSilicon. Other considerations on UE power saving. R1-1911874, 3GPP TSG RAN WG1 Meeting #99, Nov. 18-22, 2019.
OPPO. Introduction of dormancy behavior in NR, R2-1913942, 3GPP TSG-RAN WG2 Meeting #107bis, Oct. 14-18, 2019.
The first office action issued in corresponding CN application No. 202010072622.0 dated May 20, 2021.
The second office action issued in corresponding CN application No. 202010072622.0 dated Aug. 31, 2021.

\* cited by examiner

METHOD FOR DETERMINING A STATE, ELECTRONIC DEVICE, AND NON-TRANSITORY COMPUTER-READABLE STORAGE MEDIUM

CROSS-REFERENCE TO RELATED APPLICATION(S)

This application is a National Stage of International Application No. PCT/CN2021/075845, filed on Feb. 7, 2021, which claims priority to Chinese Patent Application No. 202010072622.0, filed on Jan. 21, 2020, both of which are incorporated herein by reference in their entireties.

TECHNICAL FIELD

This disclosure relates to the field of communication technology, and in particular, to a method for determining a state, an electronic device, and a non-transitory computer-readable storage medium.

BACKGROUND

In the 5th generation mobile communication technology (5G) release 16 (Rel-16), a secondary cell (SCell) dormancy mechanism is introduced.

When there are fewer data services, a gNodeB (gNB) transmits to a user equipment (UE) signaling indicative of that a certain SCell enters a dormancy state. In response to reception of the signaling indicative of that the SCell enters the dormancy state, the UE switches, on the SCell, to a dormant bandwidth part (BWP), i.e., the UE uses the dormant BWP as an activated BWP (or active BWP). The UE does not need to monitor on the dormant BWP physical downlink control channels (PDCCHs), thereby relatively saving energy (or power).

When there are more data services, the gNB transmits to the UE signaling indicative of that a SCell enters a non-dormancy state. In response to reception of the signaling indicative of that the SCell enters the non-dormancy state, the UE switches back to a non-dormant BWP, i.e., the UE uses the non-dormant BWP as the activated BWP. The UE needs to monitor, on the non-dormant BWP, PDCCHs and can acquire on the SCell many scheduling chances, such that higher-rate data services can be supported. Adaption between data rate (throughput) and energy saving can be reached through switching between the SCell dormancy state and the SCell non-dormancy state.

Generally, a SCell group consists of multiple SCells. In a discontinuous reception (DRX) active time, a gNB transmits signaling indicative of switching between a SCell dormancy state and a SCell non-dormancy state through a primary cell (PCell) or a primary secondary cell (PSCell). When the switching signaling indicates that the SCell group enters the SCell dormancy state, all SCells in the SCell group enter the SCell dormancy state. When the switching signaling indicates that the SCell group enters the SCell non-dormancy state, i.e., when the SCell group is activated, all the SCells in the SCell group enter the SCell non-dormancy state. In this case, the UE may not need to use all the SCells in the whole SCell group to communicate with the gNB, while redundant activated SCells (or active SCells) may cause that the UE needs to additionally monitor redundant PDCCHs, which is not conducive to energy saving for the UE.

Based on this, how to avoid that a UE needs to consume too much energy to additionally monitor redundant PDCCHs, which is caused by simultaneously changing states of all SCells in a SCell group through controlling signaling, is an urgent problem to-be-solved.

SUMMARY

A method for determining a state is provided. The method for determining a state includes acquiring indication signaling, and determining that a SCell in a SCell sub-group enters a dormancy state or a non-dormancy state, according to the indication signaling.

An electronic device is provided. The electronic device includes a memory storing computer programs and a processor. The computer programs are executed by the processor to cause the processor to acquire indication signaling, and determine that a SCell in a SCell sub-group enters a dormancy state or a non-dormancy state, according to the indication signaling.

A non-transitory computer-readable storage medium is provided. The computer-readable storage medium stores computer programs, where the computer programs are executed by a processor to acquire indication signaling, and determine that a SCell in a SCell sub-group enters a dormancy state or a non-dormancy state, according to the indication signaling.

DETAILED DESCRIPTION

The following will further illustrate the disclosure by means of implementations, but the disclosure is not limited to the scope of the implementations.

Embodiment 1

Figure 1:
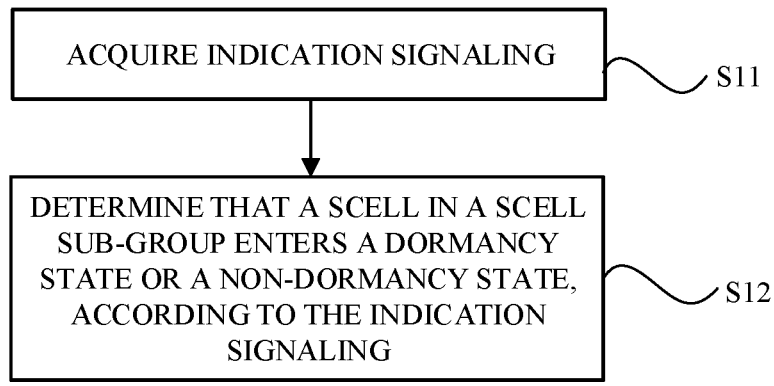
FIG. 1 is a flow chart illustrating a method for determining a state according to embodiment 1 of the disclosure.

A method for determining a state is provided in the embodiment. The method for determining a state is used to determine a state of a secondary cell (SCell). As illustrated in FIG. 1, the method for determining a state includes the following.

At S11, acquire indication signaling.

At S12, determine that a SCell in a SCell sub-group enters a dormancy state or a non-dormancy state, according to the indication signaling.

In the disclosure, a SCell in a SCell sub-group enters a dormancy state or a non-dormancy state, which can also be called that the SCell sub-group enters the dormancy state or the non-dormancy state. Similarly, a SCell in a SCell group enters a dormancy state or a non-dormancy state, which can also be called that the SCell group enters the dormancy state or the non-dormancy state.

In the disclosure, a SCell in a SCell sub-group enters a dormancy state or a non-dormancy state, which is equal to that an activated SCell in the SCell sub-group enters the dormancy state or the non-dormancy state. Similarly, a SCell in a SCell group enters a dormancy state or a non-dormancy state, which is equal to that an activated SCell in the SCell group enters the dormancy state or the non-dormancy state.

Furthermore, after the SCell enters the dormancy state, it is determined not to monitor physical downlink control channels (PDCCHs) on the SCell. After the SCell enters the non-dormancy state, it is determined to monitor PDCCHs on the SCell.

In the disclosure, the SCell sub-group is a sub-group of a SCell group where the SCell is located. The number of the SCell sub-group is less than or equal to the number of the SCell group, such that the number of bits of indication signaling (a bitmap) indicating a SCell sub-group state monitored on a SCell is less than or equal to the number of bits of indication signaling (a bitmap) indicating a SCell group state monitored on a primary cell (PCell) or a primary secondary cell (PSCell). For definitions and running logics of the SCell group, reference can be made to standard definitions.

Preferably, the indication signaling is a bit in a bitmap, where the bitmap may be a number sequence consisting of 0 and 1.

A bit in the bitmap can correspond to a SCell sub-group. In other words, a state of one or more SCells in one SCell sub-group is indicated by the bit.

In a specific implementation, if the bit is 0, the SCell in the SCell sub-group is determined to enter the dormancy state. If the bit is 1, the SCell in the SCell sub-group is determined to enter the non-dormancy state.

In another specific implementation, if the bit is 1, the SCell in the SCell sub-group is determined to enter the dormancy state. If the bit is 0, the SCell in the SCell sub-group is determined to enter the non-dormancy state.

Preferably, an association between bits in the bitmap and SCell sub-groups is acquired through a higher-layer parameter, where the higher-layer parameter can be transmitted by a gNodeB (gNB) to a user equipment (UE).

In the disclosure, the indication signaling can be acquired by receiving a PDCCH on the SCell.

If the SCell sub-group includes multiple SCells, the indication signaling can be acquired by receiving a PDCCH on any one SCell in the SCell sub-group.

In the disclosure, a start location of the indication signaling in downlink control information (DCI) is provided by a higher-layer parameter. The start location of the indication signaling in the DCI can be the same as a start location of indication signaling indicating a SCell group state in the DCI. The indication signaling indicating the SCell group state is indication signaling indicative of that a SCell enters the dormancy state or indication signaling indicative of that a SCell enters the non-dormancy state. Generally, the UE acquires the indication signaling indicating the SCell group state by receiving a PDCCH on a PCell or a PSCell. As such, the gNB can indirectly configure the start location of the indication signaling in the DCI by configuring the start location of the indication signaling indicating the SCell group state in the DCI, thereby saving signaling overhead.

Preferably, a SCell list of the SCell sub-group can be acquired through a higher-layer parameter.

In the disclosure, the SCell entering the dormancy state may include switching to a dormant BWP on the SCell, or using the dormant BWP as an activated BWP on the SCell.

In addition, the SCell entering the dormancy state may further include stopping monitoring PDCCHs on the SCell in a DRX active time, or stopping monitoring the PDCCHs on the SCell in a duration.

In a specific application scenario, for example, a SCell group includes 10 SCells, and a state of the SCell group is controlled by a bit, where if the bit is 0, it is indicated that the SCell group enters the dormancy state, and if the bit is 1, it is indicated that the SCell group enters the non-dormancy state.

Under a situation that the SCell group is not further subdivided, the UE monitors an indication on a PCell or a PSCell. If the bit indicating a state is 0, all the 10 SCells in the SCell group enter the dormancy state, and in this case, the UE stops monitoring the 10 SCells. If the bit indicating a state is 1, all the 10 SCells in the SCell group enter the non-dormancy state, and the UE needs to monitor the 10 SCells. In this case, during communication between the UE and the gNB, it may be unnecessary to monitor PDCCHs on so many SCells, resulting in excessive consumption of energy of the UE.

In a case, the SCell group is divided into 5 SCell sub-groups, and each SCell sub-group includes 2 SCells. In this case, the UE can monitor an indication on a certain SCell (generally, a SCell group where the SCell belongs to is already indicated to enter the non-dormancy state). For one SCell sub-group (e.g., includes SCell 1 and SCell 2), indication signaling is a bit, where the indication signaling indicates a state of the SCell sub-group. If the bit is 0, the SCell sub-group (the SCell 1 and the SCell 2) enters the dormancy state. If the bit is 1, the SCell sub-group (the SCell 1 and the SCell 2) enters the non-dormancy state. Alternatively, if the bit is 1, the SCell sub-group (the SCell 1 and the SCell 2) enters the dormancy state. If the bit is 0, the SCell sub-group (the SCell 1 and the SCell 2) enters the non-dormancy state.

According to the method for determining a state provided in the disclosure, one SCell group can be divided into multiple SCell sub-groups, the number of SCells in each of the multiple SCell sub-groups can be flexibly controlled to be relatively small, such that the multiple SCell sub-groups of the SCell group can be respectively controlled through signaling, avoiding that it needs to simultaneously monitor PDCCHs on redundant SCells, thereby effectively saving energy of the UE.

In addition, by setting to stop monitoring the PDCCHs on the SCell in the DRX active time, it can be realized that PDCCH monitoring is reduced on the SCell only in the current DRX active time, which can not only save energy, but also ensure that normal PDCCH monitoring can be quickly restored in a subsequent DRX cycle. Alternatively, by setting to stop monitoring the PDCCHs on the SCell in the duration, it can be realized that PDCCH monitoring is reduced on the SCell only in the duration, which can not only save energy, but also ensure that normal PDCCH monitoring can be quickly restored subsequent to the duration. The duration may be a period of time of an active time in a DRX cycle, and may also be a period of time consisting of multiple DRX cycles.

An execution body of the method for determining a state provided in the embodiment may be a separate chip, a chip module, or a UE, and may also be a chip or a chip module integrated into a UE.

Embodiment 2

Figure 2:
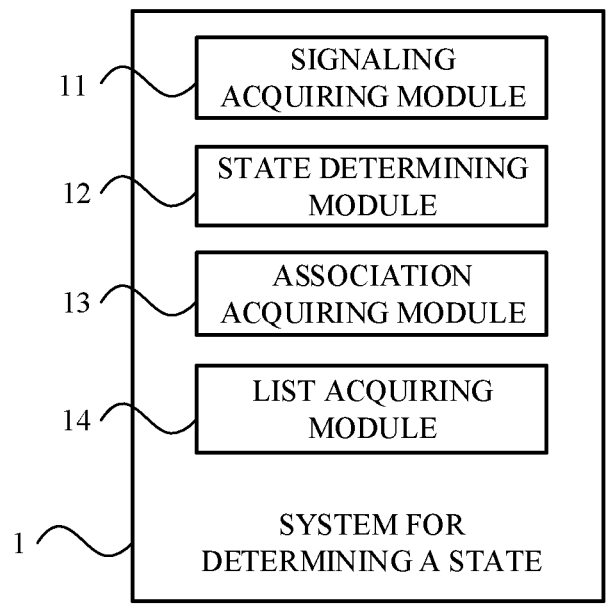
FIG. 2 is a structural block diagram illustrating a system for determining a state according to embodiment 2 of the disclosure.

A system for determining a state is provided in the embodiment. The system for determining a state is used to determine a state of a SCell. As illustrated in FIG. 2, the system for determining a state 1 includes a signaling acquiring module 11 and a state determining module 12.

The signaling acquiring module 11 is configured to acquire indication signaling. The state determining module 12 is configured to determine that a SCell in a SCell sub-group enters a dormancy state or a non-dormancy state, according to the indication signaling.

Furthermore, after the SCell enters the dormancy state, it is determined not to monitor PDCCHs on the SCell. After the SCell enters the non-dormancy state, it is determined to monitor PDCCHs on the SCell.

In the disclosure, the SCell sub-group is a sub-group of a SCell group where the SCell is located. The number of the SCell sub-group is less than or equal to the number of the SCell group, such that the number of bits of indication signaling (a bitmap) indicating a SCell sub-group state monitored on a SCell is less than or equal to the number of bits of indication signaling (a bitmap) indicating a SCell group state monitored on a PCell or a PSCell. For definitions and running logics of the SCell group, reference can be made to standard definitions.

Preferably, the indication signaling is a bit in a bitmap, where the bitmap may be a number sequence consisting of 0 and 1.

A bit in the bitmap can correspond to a SCell sub-group. In other words, a state of one or more SCells in one SCell sub-group is indicated by the bit.

In a specific implementation, if the bit is 0, the state determining module 12 determines that the SCell in the SCell sub-group enters the dormancy state. If the bit is 1, the state determining module 12 determines that the SCell in the SCell sub-group enters the non-dormancy state.

In a specific implementation, if the bit is 1, the state determining module 12 determines that the SCell in the SCell sub-group enters the dormancy state. If the bit is 0, the state determining module 12 determines that the SCell in the SCell sub-group enters the non-dormancy state.

Preferably, the system for determining a state 1 further includes an association acquiring module 13. The association acquiring module 13 is configured to acquire an association between bits in the bitmap and SCell sub-groups through a higher-layer parameter. That is to say, the association acquiring module 13 can receive the higher-layer parameter, and recognize and read out the association between bits in the bitmap and SCell sub-groups from the higher-layer parameter.

The higher-layer parameter can be transmitted by a gNB to a UE.

In the disclosure, the signaling acquiring module 11 is configured to acquire the indication signaling by receiving a PDCCH on the SCell.

If the SCell sub-group includes multiple SCells, the signaling acquiring module 11 can acquire the indication signaling by receiving a PDCCH on any one SCell in the SCell sub-group.

In the disclosure, a start location of the indication signaling in DCI is provided by a higher-layer parameter. The start location of the indication signaling in the DCI can be the same as a start location of indication signaling indicating a SCell group state in the DCI. The indication signaling indicating the SCell group state is indication signaling indicative of that a SCell enters the dormancy state or indication signaling indicative of that a SCell enters the non-dormancy state. Generally, the UE acquires the indication signaling indicating the SCell group state by receiving a PDCCH on a PCell or a PSCell. As such, the gNB can indirectly configure the start location of the indication signaling in the DCI by configuring the start location of the indication signaling indicating the SCell group state in the DCI, thereby saving signaling overhead.

Preferably, the system for determining a state 1 further includes a list acquiring module 14. The list acquiring module 14 is configured to acquire a SCell list of the SCell sub-group through a higher-layer parameter. That is to say, the list acquiring module 14 can receive the higher-layer parameter, and recognize and read out the SCell list from the higher-layer parameter.

In the disclosure, the state determining module 12 is configured to switch to a dormant BWP on the SCell. Alternatively, the state determining module 12 is configured to use the dormant BWP as an activated BWP on the SCell.

The state determining module 12 is configured to stop monitoring PDCCHs on the SCell in a DRX active time. Alternatively, the state determining module 12 is configured to stop monitoring the PDCCHs on the SCell in a duration.

In a specific application scenario, for example, a SCell group includes 10 SCells, and a state of the SCell group is controlled by a bit, where if the bit is 0, it is indicated that the SCell group enters the dormancy state, and if the bit is 1, it is indicated that the SCell group enters the non-dormancy state.

Under a situation that the SCell group is not further subdivided, the UE monitors an indication on a PCell or a PSCell. If the bit indicating a state is 0, all the 10 SCells in the SCell group enter the dormancy state, and in this case, the UE stops monitoring the 10 SCells. If the bit indicating a state is 1, all the 10 SCells in the SCell group enter the non-dormancy state, and the UE needs to monitor the 10 SCells. In this case, during communication between the UE and the gNB, it may be unnecessary to monitor PDCCHs on so many SCells, resulting in excessive consumption of energy of the UE.

In a case, the SCell group is divided into 5 SCell sub-groups, and each SCell sub-group includes 2 SCells. In this case, the UE can monitor an indication on a certain SCell (generally, a SCell group where the SCell belongs to is already indicated to enter the non-dormancy state). For one SCell sub-group (e.g., includes SCell 1 and SCell 2), indication signaling is a bit, where the indication signaling indicates a state of the SCell sub-group. If the bit is 0, the SCell sub-group (the SCell 1 and the SCell 2) enters the dormancy state. If the bit is 1, the SCell sub-group (the SCell 1 and the SCell 2) enters the non-dormancy state. Alternatively, if the bit is 1, the SCell sub-group (the SCell 1 and the SCell 2) enters the dormancy state. If the bit is 0, the SCell sub-group (the SCell 1 and the SCell 2) enters the non-dormancy state.

When the system for determining a state provided in the disclosure is running, one SCell group can be divided into multiple SCell sub-groups, the number of SCells in each of the multiple SCell sub-groups can be flexibly controlled to be relatively small, such that the multiple SCell sub-groups of the SCell group can be respectively controlled through signaling, avoiding that it needs to simultaneously monitor PDCCHs on redundant SCells, thereby effectively saving energy of the UE.

In addition, by setting to stop monitoring the PDCCHs on the SCell in the DRX active time, it can be realized that PDCCH monitoring is reduced on the SCell only in the current DRX active time, which can not only save energy, but also ensure that normal PDCCH monitoring can be quickly restored in a subsequent DRX cycle. Alternatively, by setting to stop monitoring the PDCCHs on the SCell in the duration, it can be realized that PDCCH monitoring is reduced on the SCell only in the duration, which can not only save energy, but also ensure that normal PDCCH monitoring can be quickly restored subsequent to the duration. The duration may be a period of time of an active time in a DRX cycle, and may also be a period of time consisting of multiple DRX cycles.

The system for determining a state illustrated in the embodiment may specifically be a separate chip, a chip module, or the UE, and may also be a chip or a chip module integrated into the UE. Each module/unit in the system for determining a state may be a software module/unit, a hardware module/unit, or may be partially a software module/unit and partially a hardware module/unit. For example, For each device and product applied to or integrated into the chip, each module/unit included can be implemented by hardware such as circuits, or at least part of modules/units can be implemented by software programs that run on a processor integrated into the chip, and the rest of modules/units can be implemented by hardware such as circuits. For each device and product applied to or integrated into the chip module, each module/unit included can be implemented by hardware such as circuit, and different modules/units can be located in a same component (such as a chip, a circuit module, etc.) or different components of the chip module. Alternatively, at least part of modules/units can be implemented by software programs that run on the processor integrated into the chip module, and the rest of modules/units can be implemented by hardware such as circuits. For each device and product applied to or integrated into the UE, each module/unit included can be implemented by hardware such as circuits, and different modules/units can be located in a same component (e.g., a chip, a circuit module, etc.) or different components in the terminal device, or at least part of modules/units can be implemented by software programs that run on the processor integrated into the UE, and the rest of modules/units can be implemented by hardware such as circuits.

Embodiment 3

Figure 3:
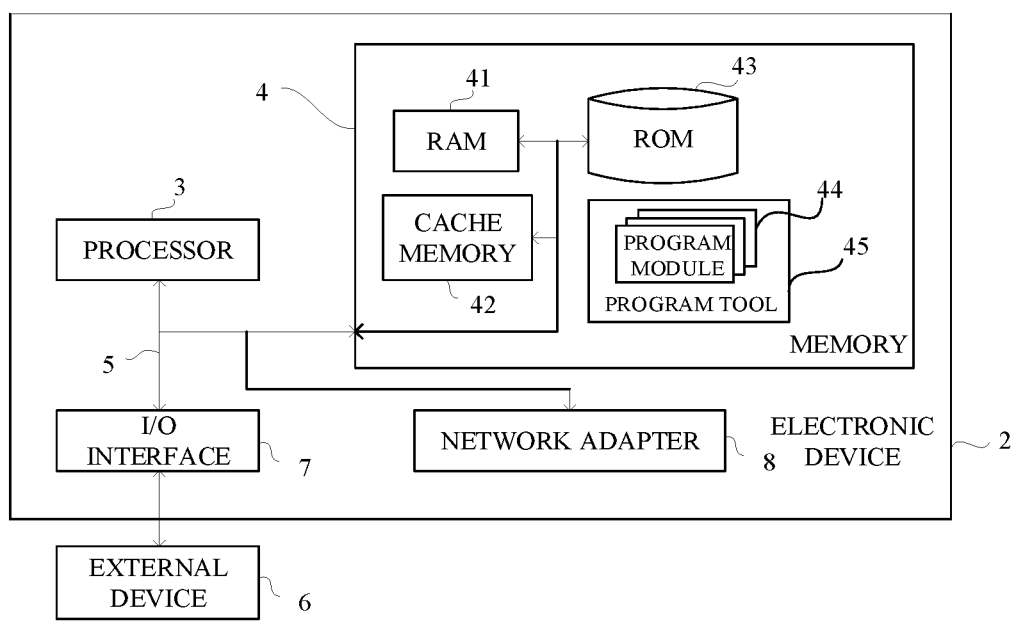
FIG. 3 is a structural block diagram illustrating an electronic device according to embodiment 3 of the disclosure.

An electronic device is further provided in the disclosure. As illustrated in FIG. 3, the electronic device includes a memory, a processor, and computer programs that are stored in the memory and capable of running on the processor. The processor is configured to execute the programs to implement the operations of the method for determining a state in the foregoing embodiment 1.

It can be understood that, the electronic device illustrated in FIG. 3 is only an example and may not constitute any limitation to functions and application scopes of implementations of the disclosure.

As illustrated in FIG. 3, an electronic device 2 may be represented as a general computing device, e.g., a server device. Components of the electronic device 2 may include but are not limited to at least one processor 3, at least one memory 4, and a bus 5 coupled with different system components (including the memory 4 and the processor 3).

The bus 5 includes a data bus, an address bus, and a control bus.

The memory 4 may include a volatile memory, e.g., a random-access memory (RAM) 41 and/or a cache memory 42, and may also further include a read-only memory (ROM) 43.

The memory 4 may also include a program tool 45 (or a practical tool) with a set (at least one) program module 44, where the program module 44 includes but is not limited to an operating system, one or more application programs, other program modules, and program data. Each of or a combination of these examples may include implementation of the network environment.

The processor 3 is configured to execute the computer programs stored in the memory 4 to perform various functional applications and data processing, e.g., the operations of the method for determining a state in the foregoing embodiment 1 in the disclosure.

The electronic device 2 can also communicate with one or more external devices 6 (for example, a keyboard, a pointing device, and so on). The communication can be implemented through an input/output (I/O) interface 7. The electronic device 2 can also communicate with one or more networks (e.g., a local area network (LAN), a wide area network (WAN), and/or a public network) through a network adapter 8.

As illustrated in FIG. 3, the network adapter 8 communicates with other modules of the model-generated electronic device 2 via the bus 5. Those skilled in the art should understand that although not illustrated in the figure, other hardware and/or software modules can be used by combining the electronic device 2, including but not limited to: a micro code, a device driver, a redundant processor, an external disk drive array, a redundant array of independent disk (RAID) system, a disk drive, and a data backup storage system.

It should be noted that although several units/modules or subunits/modules of the electronic device are mentioned in the above detailed illustration, this division is only exemplary and not mandatory. Actually, according to the implementations of the disclosure, the features and functions of two or more units/modules illustrated above can be implemented in one unit/module. On the contrary, the features and functions of one unit/module illustrated above can be further divided into multiple units/modules to be implemented.

Embodiment 4

A computer-readable storage medium is provided in the embodiment. The computer-readable storage medium is configured to store computer programs which when executed by a processor, implement the operations of the method for determining a state in the foregoing embodiment 1.

The readable storage medium may specifically include but is not limited to a portable disk, a hard disk, an RAM, an ROM, an erasable programmable ROM (EPROM), an optical storage device, a magnetic storage device, or any suitable combination thereof.

In a possible implementation, the disclosure can also be implemented as a program product. The program product includes program codes which when executed on a terminal device, enable the terminal device to implement the operations of the method for determining a state in the foregoing embodiment 1.

The program codes used to execute the disclosure can be programmed through any combinations of one or more types of program design languages. The program codes can be executed completely or partially on a UE, executed as a separate software packet, executed partially on the UE and partially on a remote device, or executed completely on the remote device.

A technical problem to-be-solved in the disclosure is to overcome a deficiency that a user equipment (UE) needs to consume too much energy to additionally monitor redundant physical downlink control channels (PDCCHs), which is caused by simultaneously changing states of all secondary cells (SCells) in a SCell group through controlling signaling in the related art. A method and system for determining a state, a medium, and an electronic device are provided.

In the disclosure, the following technical solutions are used to solve the above technical problem.

A method for determining a state is provided. The method for determining a state includes acquiring indication signaling, and determining that a SCell in a SCell sub-group enters a dormancy state or a non-dormancy state, according to the indication signaling.

Optionally, the indication signaling is a bit in a bitmap.

Optionally, a bit in the bitmap corresponds to a SCell sub-group.

Optionally, an association between bits in the bitmap and SCell sub-groups is acquired through a higher-layer parameter.

Optionally, if the bit is 0, the SCell in the SCell sub-group is determined to enter the dormancy state. If the bit is 1, the SCell in the SCell sub-group is determined to enter the non-dormancy state.

Optionally, if the bit is 1, the SCell in the SCell sub-group is determined to enter the dormancy state. If the bit is 0, the SCell in the SCell sub-group is determined to enter the non-dormancy state.

Optionally, acquire the indication signaling by receiving a PDCCH on the SCell.

Optionally, the SCell sub-group is a sub-group of a SCell group where the SCell is located.

Optionally, a SCell list of the SCell sub-group is acquired through a higher-layer parameter.

Optionally, the SCell entering the dormancy state includes switching to a dormant bandwidth part (BWP) on the SCell or using the dormant BWP as an activated BWP on the SCell.

Optionally, the SCell entering the dormancy state includes stopping monitoring PDCCHs on the SCell in a discontinuous reception (DRX) active time, or stopping monitoring the PDCCHs on the SCell in a duration.

A system for determining a state is provided. The system for determining a state includes a signaling acquiring module and a state determining module. The signaling acquiring module is configured to acquire indication signaling. The state determining module is configured to determine that a SCell in a SCell sub-group enters a dormancy state or a non-dormancy state, according to the indication signaling.

Optionally, the indication signaling is a bit in a bitmap.

Optionally, a bit in the bitmap corresponds to a SCell sub-group.

Optionally, the system for determining a state further includes an association acquiring module. The association acquiring module is configured to acquire an association between bits in the bitmap and SCell sub-groups through a higher-layer parameter.

Optionally, the state determining module is configured to determine that the SCell in the SCell sub-group enters the dormancy state if the bit is 0. The state determining module is configured to determine that the SCell in the SCell sub-group enters the non-dormancy state if the bit is 1.

Optionally, the state determining module is configured to determine that the SCell in the SCell sub-group enters the dormancy state if the bit is 1. The state determining module is configured to determine that the SCell in the SCell sub-group enters the non-dormancy state if the bit is 0.

Optionally, the signaling acquiring module is configured to acquire the indication signaling by receiving a PDCCH on the SCell.

Optionally, the SCell sub-group is a sub-group of a SCell group where the SCell is located.

Optionally, the system for determining a state further includes a list acquiring module. The list acquiring module is configured to acquire a SCell list of the SCell sub-group through a higher-layer parameter.

Optionally, the state determining module is configured to switch to a dormant BWP on the SCell. Alternatively, the state determining module is configured to use the dormant BWP as an activated BWP on the SCell.

Optionally, the state determining module is configured to stop monitoring PDCCHs on the SCell in a DRX active time.

Optionally, the state determining module is configured to stop monitoring the PDCCHs on the SCell in a duration.

An electronic device is provided. The electronic device includes a memory, a processor, and computer programs stored in the memory and capable of running on the processor. When executing the computer programs, the processor implements the operations of the foregoing method for determining a state.

A computer-readable storage medium is provided. The computer-readable storage medium stores computer programs, where the computer programs are executed by a processor to implement the operations of the foregoing method for determining a state.

The positive progress effect of the disclosure is that according to the method and system for determining a state, the medium, and the electronic device in the disclosure, one SCell group can be divided into multiple SCell sub-groups, and the number of SCells in each of the multiple SCell sub-groups can be flexibly controlled to be relatively small, such that the multiple SCell sub-groups of the SCell group can be respectively controlled through signaling, avoiding that it needs to simultaneously monitor PDCCHs on redundant SCells, thereby effectively saving energy of the UE.

In addition, by setting to stop monitoring the PDCCHs on the SCell in the DRX active time, it can be realized that PDCCH monitoring is reduced on the SCell only in the current DRX active time, which can not only save energy, but also ensure that normal PDCCH monitoring can be quickly restored in a subsequent DRX cycle.

What is claimed is:

1. A method for determining a state, comprising:
   acquiring indication signaling; and
   determining that a secondary cell (SCell) in a SCell sub-group enters a dormancy state or a non-dormancy state, according to the indication signaling,
   wherein the SCell entering the dormancy state comprises:
   switching to a dormant bandwidth part (BWP) on the SCell; or
   in a discontinuous reception (DRX) active time, stopping monitoring physical downlink control channels (PDCCHs) on the SCell.

2. The method for determining a state of claim 1, wherein the indication signaling is a bit in a bit map.

3. The method for determining a state of claim 2, wherein a bit in the bit map corresponds to a SCell sub-group.

4. The method for determining a state of claim 3, wherein an association between bits in the bit map and SCell sub-groups is acquired through a higher-layer parameter.

5. The method for determining a state of claim 2, wherein
   if the bit is 0, the SCell in the SCell sub-group is determined to enter the dormancy state; and
   if the bit is 1, the SCell in the SCell sub-group is determined to enter the non-dormancy state.

6. The method for determining a state of claim 2, wherein
   if the bit is 1, the SCell in the SCell sub-group is determined to enter the dormancy state; and
   if the bit is 0, the SCell in the SCell sub-group is determined to enter the non-dormancy state.

7. The method for determining a state of claim 1, comprising:
acquiring the indication signaling by receiving a physical downlink control channel (PDCCH) on the SCell.

8. The method for determining a state of claim 7, wherein the SCell sub-group is a sub-group of a SCell group where the SCell is located.

9. The method for determining a state of claim 8, wherein a SCell list of the SCell sub-group is acquired through a higher-layer parameter.

10. An electronic device, comprising:
a processor; and
a memory storing computer programs;
the computer programs being executed by the processor to cause the processor to:
acquire indication signaling; and
determine that a secondary cell (SCell) in a SCell sub-group enters a dormancy state or a non-dormancy state, according to the indication signaling,
wherein the SCell entering the dormancy state comprises:
switching to a dormant bandwidth part (BWP) on the SCell; or
in a discontinuous reception (DRX) active time, stopping monitoring physical downlink control channels (PDCCHs) on the SCell.

11. The electronic device of claim 10, wherein the indication signaling is a bit in a bit map.

12. The electronic device of claim 11, wherein a bit in the bit map corresponds to a SCell sub-group.

13. The electronic device of claim 12, wherein the computer programs are further executed by the processor to cause the processor to:
acquire an association between bits in the bit map and SCell sub-groups through a higher-layer parameter.

14. The electronic device of claim 11, wherein the computer programs executed by the processor to cause the processor to determine that the SCell in the SCell sub-group enters the dormancy state or the non-dormancy state according to the indication signaling cause the processor to:
determine that the SCell in the SCell sub-group enters the dormancy state if the bit is 0; and
determine that the SCell in the SCell sub-group enters the non-dormancy state if the bit is 1.

15. The electronic device of claim 11, wherein the computer programs executed by the processor to cause the processor to determine that the SCell in the SCell sub-group enters the dormancy state or the non-dormancy state according to the indication signaling cause the processor to:
determine that the SCell in the SCell sub-group enters the dormancy state if the bit is 1; and
determine that the SCell in the SCell sub-group enters the non-dormancy state if the bit is 0.

16. The electronic device of claim 10, wherein the computer program executed by the processor to cause the processor to acquire the indication signaling causes the processor to acquire the indication signaling by receiving a physical downlink control channel (PDCCH) on the SCell.

17. A non-transitory computer-readable storage medium storing computer programs, wherein the computer programs are executed by a processor to cause the processor to:
acquire indication signaling; and
determine that a secondary cell (SCell) in a SCell sub-group enters a dormancy state or a non-dormancy state, according to the indication signaling,
wherein the SCell entering the dormancy state comprises:
switching to a dormant bandwidth part (BWP) on the SCell; or
in a discontinuous reception (DRX) active time, stopping monitoring physical downlink control channels (PDCCHs) on the SCell.

* * * * *